United States Patent Office 3,253,926
Patented May 31, 1966

3,253,926
LIGHT-SENSITIVE SILVER HALIDE MATERIAL CONTAINING HYDROPHOBIC STARCH DERIVATIVES
Paul Desiré Van Pee, Edegem-Antwerp, and José Thérèse Lemmerling and Hendrik Adolf Pattyn, Wilrijk-Antwerp, Belgium
No Drawing. Filed Jan. 8, 1962, Ser. No. 164,978
15 Claims. (Cl. 96—114)

This invention relates to light-sensitive materials comprising finely divided grains of a hydrophobic starch derivative.

It is known from the Belgian patent specification 576,365 to add finely divided polycarbonate grains to the light-sensitive emulsion layer or to an adjacent layer, in order to cause special photographic effects such as matting. By this addition a certain roughness on the surface is obtained which protects it against damages, facilitates retouching and prevents the formation of Newton rings by preventing a too close contact between the negative material and the copying material on contact-printing or between the negative material and its glass holder on enlarging.

It is known from German patent specification K 158,-468, opened to public inspection on February 4, 1942, to add small amounts of finely divided grains, especially of startch to the top layer of a light-sensitive photographic material. A surface-roughness is also obtained hereby which prevents moisture stains and the formation of Newton-rings on copying and on enlarging.

In both cases a rough surface is obtained which involves different advantages and whereby the photographic reproduction seems to mat when a large amount of a finely granular substance is added and on the other hand does not mat when a small amount of granular substance is added.

In order to obtain satisfying results the used chemical compounds should meet certain requirements such as high refractive index, low covering power, low density, relative weakness, colourlessness and complete inertness with regard to the light-sensitive emulsion. The grains should moreover be able of inform division and should be all of the same size in order to remain invisible when projecting.

Starch grains have the disadvantage to swell when absorbing water and to shrink when giving off water, so that the layer containing starch grains contracts too much on drying, with the result that the paper or film used as a support rolls up or curls during or after the drying process. Starch has further the disadvantage to solidify when drying mechanically by heat.

Polycarbonate grains can very well be divided uniformly but differ too much in size. Indeed, the diameter of polycarbonate grains varies from 0.1 to 5μ.

It has now been found that matting and/or many technical improvements of photographic prints can be obtained by adding finely divided grains of hydrophobic starch derivatives to the light-sensitive gelatino silver halide emulsion layer and/or to a layer adjacent thereto.

As suited starch derivatives according to the present invention may be considered the reaction products of urea and formaldehyde with starch, preferably rice starch, starch carbamates and all hydrophobic starch esters such as starch acetate, starch stearate and other derivatives of the following formula:

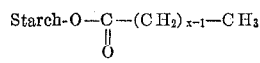

wherein $x$ varies from 1 to 25.

Grains of hydrophobic starch derivatives do not swell such as common starch by absorbing water or by the increase of temperature, and they do not stiffen up when dried mechanically by heat. They are completely inert and colourless and keep their grain structure and grain diameter which for rice starch derivatives amounts to between 5 and 6μ. They can further especially uniformly be spread out onto the surface. They have a low covering power and a suited refractive index in respect of gelatin. By their low specific weight, they do not give rise to any difficulty during coating. Finally, the relative weakness of the products according to the present invention facilitates retouching of the photographic image.

By adding hydrophobic starch derivatives according to the present invention, matting of photographic images can be obtained and/or different important improvements can be introduced to photographic films.

If to the light-sensitive silver halide emulsion layer and/or to an adjacent layer 25 to 400 grains are added per sq. mm., a surface-roughness is obtained is obtained caused by the small unevennesses of the hydrophobic starch grains without causing, however, a matting effect. Photographic films treated in such a way are better proof against mechanical damage, show no moisture stains after drying the emulsions, and are proof against too high static charging. As to the negative material, no optical faults such as Newton rings will arise on copying or on enlarging.

If more than 400 grains of the products according to this invention are added per sq. mm. a matting effect is moreover obtained which is e.g. desired for materials to be viewed by reflection.

In some circumstances by using products according to the present invention, it has been established that the photographic film loses some of its flexibility. This can be prevented by adding softening agents such as those described in the British patent application 23,202/61.

Some preparations of hydrophobic starch derivatives according to the present invention are given hereinafter.

PREPARATION 1

*Reaction product of urea and formaldehyde with rice starch*

The preparation of such reaction products is described among others by R. W. Kerr in "Chemistry and Industry of Starch," 1950, pp. 74, 472 and 509.

The following method of preparation gives a product with a still stronger matting effect and which causes only a small loss of maximum density.

1100 g. of undried rice starch, which contains 10% of water and which has a grain-size comprised between 3 and 8μ, is thoroughly stirred for 1 hr. 30 at room temperature in a solution of 110 g. of urea in 1100 cm.³ of distilled water. Thereupon this suspension is brought in a mixture of the following composition:

Acetone _____ cm.³__ 4000
Maleic anhydride _____ g__ 10
40% aqueous solution of formaldehyde __ cm.³__ 340
Distilled water _____ cm.³__ 120

This mixture is stirred at room temperature until the maleic anhydride is dissolved. Then the reaction mixture is heated for 2 hr. at 40° C. with thorough stirring. Then the reaction mixture is brought at 60° C. in maximum 15 min. and stirred for further 4 hr. at this temperature.

The reaction product of urea and formaldehyde with rice starch is sucked off till a moisture content of about 200% by weight of the dry product and then washed until the product is free from formaldehyde.

PREPARATION 2

Rice starch acetate

In a three-necked flask of 500 cm.³, 150 cm.³ of xylene, 100 cm.³ of acetic anhydride and 40 cm.³ of acetic acid are brought at 50° C. To this mixture are added 0.5 cm.³ of chemically pure sulphuric acid and 20 g. of rice starch, which have been dried for 2 hr. at 60° C. The acetylation proceeds for 6 hr. at 50° C.

The reaction mass is poured into 2 l. of ethanol. Rice starch acetate flocculates, is sucked off and washed twice with ethanol. Thereupon the product is stirred for further 3 hr. in 100 cm.³ of a mixture consisting of 90 parts of ethanol and 10 parts of saturated aqueous sodium acetate. After sucking off, the derivative is still washed twice with ethanol and dried in an oven by an air current at 40° C. The substitution degree of acetyl groups amounts to 1 which corresponds with 21.2% of acetyl groups.

PREPARATION 3

Rice starch stearate

In a three-necked flask of 1 liter the following reagents are successively brought: 400 cm.³ of toluene, 100 cm.³ of anhydrous pyridine and 120 g. of stearoylchloride. This mixture is heated to 50° C. whereupon 20 g. of rice starch are added which have been dried for 2 hr. at 60° C. After 16 hr. of reaction at 50° C. the reaction mass is poured into isopropanol. The obtained rice starch stearate is separated, washed with isopropanol and thereupon dried by an air current of 40° C. The substitution degree of stearoyl groups amounts to 1.

PREPARATION 4

A mixture of 420 cm.³ of toluene, 100 cm.³ of anhydrous pyridine and 140 g. of palmitoyl chloride are brought in a three-necked flask of 1 liter and warmed at 50° C. Then 20 g. of rice starch are added which have been dried for 2 hr. at 60° C. After 24 hr. of reacting at 50°, the mass is poured out into isopropanol. The obtained rice starch palmitate is washed with isopropanol and dried for 4 hr. by an air current at 40° C. The substitution degree of palmitoyl groups amounts to 1.4.

The following examples of the use of hydrophobic starch derivatives illustrate the invention.

EXAMPLE 1

To a washed ammoniacal silver bromoiodide emulsion containing 4% of iodide, are added before coating and per kg. of emulsion 100 cm.³ of a 40% aqueous dispersion of the reaction product of Preparation 1. This emulsion is coated on a baryta-coated paper support. On this emulsion layer an anti-stress layer is applied containing per liter of coating solution, 30 cm.³ of the above dispersion. After drying the obtained material has a deep-mat surface with a maximum density of 1.40. None of the previous mentioned products yielding the same matness, reaches that density value.

EXAMPLE 2

To a silver chlorobromide emulsion containing 62% of silver bromide, is added such an amount of rice starch stearate prepared according to Preparation 3 prior to coating onto a paper support, that in addition to 10 g. of gelatin, 2 to 10 g. of this reaction product is present per sq. m. To the coating composition of the antistress layer is added such an amount of this product that in addition to 0.5 to 1 g. of gelatin, 0.5 g. to 2 g. of this product is present per sq. m. of antistress layer. The maximum density obtained with this matted light-sensitive photographic material is higher than that of a light-sensitive material having the same matting degree obtained with other matting agents.

EXAMPLE 3

30 g. of a 40% purified aqueous suspension of the reaction product obtained according to Preparation 1 is stirred at 50° C. in 1 liter of a 10% aqueous gelatin suspension. 100 g. of this suspension are then stirred in 1 l. of water at 35° C., whereupon 10 cm.³ of a 10% aqueous solution of saponine are added. 1 l. of this suspension is coated onto a graphic emulsion layer as a protective layer in such a way, that 20 sq. m. are covered therewith.

On comparing a material treated in such a way with a same material containing no product according to the present invention, it has been established that unlike the latter material, formerly the material shows no moisture stains nor Newton rings.

EXAMPLE 4

100 g. of the gelatine suspension from Example 3 is mixed at 35° C. with 1 kg. of a silver halide emulsion ready for being coated. This mixture is coated on a cellulose triacetate support in such a way that after drying, 12 g. of gelatine are present per sq. m. A material is obtained having the same properties as the material from Example 3.

EXAMPLE 5

To a 0.1% aqueous suspension of finely divided starch acetate prepared according to Preparation 2, 0.1 g. of saponine is added. This suspension is coated on a common silver halide emulsion layer in such a way, that 1 liter covers 15 sq. m. A material is obtained having the same properties as the material from Example 3.

EXAMPLE 6

To a washed contrasty gelatino silver bromoiodide emulsion containing 1 mol percent of silver iodide, 37 mg. of the following spectral sensitizer is added per gram atom after chemical ripening:

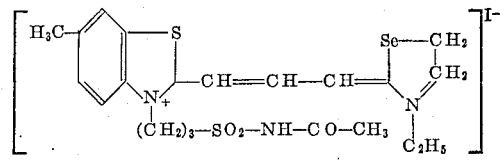

This silver halide emulsion is coated on a paper support of 90 g./sq. m. This material is used as a material to be viewed by reflection and therefore, the unfavorable light-reflections have to be avoided as much as possible. This can be obtained by adding in such a way to the light-sensitive silver halide emulsion a 40% aqueous suspension of the product according to Preparation 1, that 1.5 g. of dry product according to the invention is present per sq. m. of emulsion layer.

To the protective gelatine layer is added per sq. m. 0.5 g. of the product according to the invention.

In order to prevent possible loss of flexibility caused by the addition of the hydrophobic starch derivative ACRONAL 450 D (tradename for [copoly ethyl acrylate/vinyl isobutyl ether/styrene/acrylic acid] (66/20/12/2) marketed by Badische Anilin- & Soda-Fabrik A.G. Ludwigshafen (Rhine), Germany) is added to the above silver halide emulsion so that after coating 1.5 g. of this copolymer is present per sq. m., i.e. 20% by weight of gelatine.

The thus treated material shows a matted surface and the adhesion to the drying cloth on mechanically drying, is considerably decreased.

We claim:

1. Photographic light-sensitive material comprising at least one silver halide emulsion layer containing finely divided grains of a hydrophobic starch derivative selected from the group consisting of starch esters of the formula:

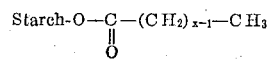

wherein $x$ is an integer of from 1 to 25 and a reaction product of urea, formaldehyde and starch.

2. Photographic light-sensitive material comprising at least one silver halide emulsion layer and at least one water-permeable layer containing finely divided grains of a hydrophobic starch derivative selected from the group consisting of starch esters of the formula:

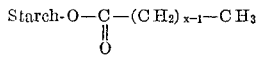

wherein $x$ is an integer of from 1 to 25 and a reaction product of urea, formaldehyde and starch being coated on the emulsion layer.

3. The photographic light-sensitive material of claim 1, wherein the finely divided grains of a hydrophobic starch derivative are finely divided grains of a hydrophobic rice starch derivative.

4. The photographic light-sensitive material of claim 2, wherein the finely divided grains of a hydrophobic starch derivative are finely divided grains of a hydrophobic rice starch derivative.

5. The photographic light-sensitive material of claim 3, wherein the finely divided grains of a hydrophobic rice starch derivative comprise finely divided grains of rice starch acetate.

6. The photographic light-sensitive material of claim 3, wherein the finely divided grains of a hydrophobic rice starch derivative comprise finely divided grains of rice starch palmitate.

7. The photographic light-sensitive material of claim 3, wherein the finely divided grains of a hydrophobic rice starch derivative comprise finely divided grains of rice starch stearate.

8. The photographic light-sensitive material of claim 4, wherein the finely divided grains of a hydrophobic rice starch derivative comprise finely divided grains of rice starch acetate.

9. The photographic light-sensitive material of claim 4, wherein the finely divided grains of a hydrophobic rice starch derivative comprise finely divided grains of rice starch palmitate.

10. The photographic light-sensitive material of claim 4, wherein the finely divided grains of a hydrophobic rice starch derivative comprise finely divided grains of rice starch stearate.

11. Photographic light-sensitive material comprising at least one silver halide emulsion layer containing finely divided grains of a hydrophobic starch derivative selected from the group consisting of starch esters of the formula:

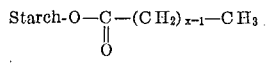

wherein $x$ is an integer of from 1 to 25 and a reaction product of urea, formaldehyde and starch, and comprising at least one water-permeable layer containing finely divided grains of a hydrophobic starch derivative selected from the same group being coated on the emulsion layer.

12. The photographic light-sensitive material of claim 11, wherein the finely divided grains of a hydrophobic starch derivative are finely divided grains of a hydrophobic rice starch derivative.

13. The photographic light-sensitive material of claim 12, wherein the finely divided grains of a hydrophobic rice starch derivative comprise finely divided grains of rice starch acetate.

14. The photographic light-sensitive material of claim 12, wherein the finely divided grains of a hydrophobic rice starch derivative comprise finely divided grains of rice starch palmitate.

15. The photographic light-sensitive material of claim 12, wherein the finely divided grains of a hydrophobic rice starch derivative comprise finely divided grains of rice starch stearate.

References Cited by the Examiner

UNITED STATES PATENTS

| | | | |
|---|---|---|---|
| 2,148,951 | 2/1939 | Maxwell. | |
| 2,276,323 | 3/1942 | Lowe | 96—114 |
| 2,322,037 | 6/1943 | Lindquist | 96—94 X |
| 3,022,169 | 2/1962 | Heckelmann | 96—114 |

OTHER REFERENCES

Kesler et al.: Paper Trade Journal, vol. 120, No. 16, pages 56–8 (1945).

NORMAN G. TORCHIN, *Primary Examiner.*

LOUISE P. QUAST, *Examiner.*

J. T. BROWN, *Assistant Examiner.*